(12) United States Patent
Mendes et al.

(10) Patent No.: US 9,956,646 B2
(45) Date of Patent: May 1, 2018

(54) MULTIPLE-BEAM LASER PROCESSING USING MULTIPLE LASER BEAMS WITH DISTINCT WAVELENGTHS AND/OR PULSE DURATIONS

(71) Applicant: IPG Photonics Corporation, Oxford, MA (US)

(72) Inventors: Marco Mendes, Manchester, NH (US); Jeffrey P. Sercel, Hollis, NH (US); Rouzbeh Sarrafi, Fremont, NH (US); Xiangyang Song, Acton, MA (US); Joshua Schoenly, Nashua, NH (US); Roy Van Gemert, Weare, NH (US); Cristian Porneala, Woburn, MA (US)

(73) Assignee: IPG Photonics Corporation, Oxford, MA (US)

( * ) Notice: Subject to any disclaimer, the term of this patent is extended or adjusted under 35 U.S.C. 154(b) by 94 days.

(21) Appl. No.: 14/633,912

(22) Filed: Feb. 27, 2015

(65) Prior Publication Data

US 2015/0246412 A1    Sep. 3, 2015

Related U.S. Application Data

(60) Provisional application No. 61/945,911, filed on Feb. 28, 2014.

(51) Int. Cl.
*B23K 26/06* (2014.01)
*B23K 26/00* (2014.01)
*B23K 103/12* (2006.01)

(52) U.S. Cl.
CPC ...... *B23K 26/0006* (2013.01); *B23K 26/0604* (2013.01); *B23K 2203/12* (2013.01)

(58) Field of Classification Search
CPC .............. B23K 26/062; B23K 26/0622; B23K 26/0624; B23K 26/40; B23K 26/0006;
(Continued)

(56) References Cited

U.S. PATENT DOCUMENTS 3,860,784 A * 1/1975 Brown ............... B23K 26/0643
219/121.64
4,248,369 A 2/1981 Clausen
(Continued)

FOREIGN PATENT DOCUMENTS

| CN | 103949779 A | 7/2014 |
|----|-------------|--------|
| WO | 2010123068 A1 | 10/2010 |
| WO | 2014012125 A1 | 1/2014 |

OTHER PUBLICATIONS

PCT International Search Report and Written Opinion dated Nov. 24, 2015, received in related PCT Application No. PCT/US15/047456, 11 pgs.
(Continued)

*Primary Examiner* — Brian Jennison
(74) *Attorney, Agent, or Firm* — Grossman, Tucker, Perreault & Pfleger, PLLC

(57) ABSTRACT

Multiple-beam laser processing may be performed on a workpiece using at least first and second laser beams with different characteristics (e.g., wavelengths and/or pulse durations). In some applications, an assist laser beam is directed at a target location on or within the workpiece to modify a property of the non-absorptive material. A process laser beam is directed at the target location and is coupled into absorption centers formed in the non-absorptive material to complete processing of the non-absorptive material. Multiple-beam laser processing may be used, for example, to drill holes in a substrate made of alumina or other transparent ceramics. In other applications, multiple-beam laser processing may be used in melting applications such as micro-welding, soldering, and forming laser fired contacts. In these applications, the assist laser beam may be used to modify a property of the material or to change the geometry of the parts.

21 Claims, 13 Drawing Sheets

(58) Field of Classification Search
CPC ............ B23K 26/0604; B23K 2203/12; B23K 2203/50
See application file for complete search history.

(56) References Cited

U.S. PATENT DOCUMENTS

| | | | |
|---|---|---|---|
| 4,338,114 | A | 7/1982 | Brockway et al. |
| 5,697,998 | A | 12/1997 | Platus et al. |
| 5,916,460 | A | 6/1999 | Imoto et al. |
| 6,376,797 | B1 | 4/2002 | Piwczyk et al. |
| 6,705,125 | B2 | 3/2004 | Peterson et al. |
| 6,841,482 | B2 | 1/2005 | Boyle |
| 7,425,471 | B2 | 9/2008 | Bruland et al. |
| 7,592,563 | B2 | 9/2009 | Wissenbach et al. |
| 7,994,450 | B2 | 8/2011 | Haight et al. |
| 8,116,341 | B2 | 2/2012 | Lei et al. |
| 8,652,658 | B2 | 2/2014 | Tatartchenko et al. |
| 2001/0009250 | A1 | 7/2001 | Herman et al. |
| 2001/0020548 | A1* | 9/2001 | Burgess ............ B23K 26/0853 174/262 |
| 2001/0035401 | A1 | 11/2001 | Manor |
| 2002/0056891 | A1 | 5/2002 | Wu |
| 2005/0279740 | A1 | 12/2005 | Liu et al. |
| 2006/0114948 | A1 | 6/2006 | Lo et al. |
| 2007/0062917 | A1 | 3/2007 | Fu et al. |
| 2007/0104243 | A1* | 5/2007 | Chen ...................... B23K 26/03 372/101 |
| 2007/0228100 | A1 | 10/2007 | Gonoe |
| 2007/0272668 | A1 | 11/2007 | Albelo et al. |
| 2008/0296272 | A1* | 12/2008 | Lei ...................... H05K 3/0035 219/121.69 |
| 2010/0177794 | A1 | 7/2010 | Peng et al. |
| 2011/0085574 | A1 | 4/2011 | Osako et al. |
| 2011/0132885 | A1 | 6/2011 | Sercel et al. |
| 2011/0139759 | A1 | 6/2011 | Millman, Jr. et al. |
| 2012/0061356 | A1 | 3/2012 | Fukumitsu |
| 2012/0255935 | A1* | 10/2012 | Kakui ................ B23K 26/0042 219/121.6 |
| 2013/0126573 | A1* | 5/2013 | Hosseini ............ B23K 26/0057 225/2 |
| 2013/0134139 | A1 | 5/2013 | Duerr et al. |
| 2013/0153554 | A1 | 6/2013 | Duerr et al. |
| 2013/0215914 | A1 | 8/2013 | Imai et al. |
| 2014/0030443 | A1 | 1/2014 | Prest et al. |
| 2014/0076299 | A1 | 3/2014 | Richter et al. |
| 2016/0001398 | A1 | 1/2016 | Kancharla et al. |

OTHER PUBLICATIONS

PCT International Search Report and Written Opinion dated Jun. 10, 2014, received in related PCT Application No. PCT/US14/19460, 13 pgs.
QCW Fiber Laser 2012 Series, Datasheet [online], IPG, Jan. 2012, https://web.archive.org/web/20120314232840/http://www.ipgphontonics.com/Collateral/Documents/English-US/QuasiCW_SM_IPG.pdf., 2 pgs.
PCT International Search Report and Written Opinion dated Nov. 27, 2015, received in related PCT Application No. PCT/US15/47485, 11 pgs.
PCT International Search Report and Written Opinion dated Jun. 8, 2015, received in corresponding PCT Application No. PCT/US15/18038, 12 pgs.
U.S. Notice of Allowance dated May 19, 2017, received in related U.S. Appl. No. 14/838,809, 6 pgs.
U.S. Office Action dated Feb. 8, 2017, received in related U.S. Appl. No. 14/838,809, 10 pgs.
U.S. Office Action dated Oct. 4, 2017, received in related U.S. Appl. No. 14/838,837, 22 pgs.
Taiwanese Office Action with English language summary, dated Nov. 16, 2017, received in TW Application No. 103106983, 11 pgs.

* cited by examiner

MULTIPLE-BEAM LASER PROCESSING USING MULTIPLE LASER BEAMS WITH DISTINCT WAVELENGTHS AND/OR PULSE DURATIONS

CROSS-REFERENCE TO RELATED APPLICATIONS

The present application claims the benefit of U.S. Provisional Patent Application Ser. No. 61/945,911 filed Feb. 28, 2014, which is fully incorporated herein by reference.

BACKGROUND OF THE DISCLOSURE

Field of the Disclosure

The present disclosure relates to laser processing and more particularly, to multiple-beam laser processing using multiple laser beams with distinct wavelengths and/or pulse durations.

Background Art Discussion

Lasers have been used to perform a wide range of material processing to alter a material in some way, for example, by ablation, melting and annealing. In particular, the material may be heated by the absorption of laser energy until the material evaporates, liquefies, or otherwise changes its state or structure. Laser processing may be difficult for certain types of materials such as materials that are transparent or reflective to the laser. Such transparent and reflective materials may not absorb the laser light at certain wavelengths sufficiently for the laser energy to alter and process the material. Laser processing of transparent materials such as alumina and sapphire, for example, is difficult using a laser operating at a wavelength around 1064 nm because most of the laser light transmits through the material instead of being absorbed by it.

When using a laser to drill holes in transparent materials, for example, the laser beam may be delivered to the target but a hole is not created if most of the laser passes through the material without sufficient absorption. The pulse energy and peak and/or average power of the laser may be increased to ensure processing of these materials, but the increased energy and power is inefficient and often results in an undesired increase in the size of the holes being drilled and a lower quality of the holes. Other techniques have required a coupling enhancer such as a coating layer to enable processing of transparent materials, which may not be desirable.

Other types of non-absorptive materials, such as reflective materials, may also be difficult to process using lasers. Welding reflective materials such as copper with a 1064 nm IR laser, for example, often requires a high enough pulse energy/power to overcome the reflectivity of the material. These high powers can make it difficult to control depth of affectation, for example, when micro-welding thin foils. Thus, laser processing applications sometimes face the unique challenge of using higher power lasers to perform the desired processing but without causing residual damage.

Accordingly, there is a need for a method for enhanced laser processing, particularly for non-absorptive materials, with lower pulse energy/average power and higher quality.

SUMMARY OF THE DISCLOSURE

Consistent with one embodiment, a method is provided for multiple-beam laser processing of a workpiece made of a non-absorptive material. The method includes: generating an assist laser beam with a first wavelength and a first pulse duration, wherein the non-absorptive material of the workpiece is sufficiently absorptive of the assist laser beam with the first wavelength and the first pulse duration to modify a property of the non-absorptive material; generating a process laser beam with a second wavelength and a second pulse duration, wherein at least one of the first and second wavelengths and the first and second pulse durations are different, and wherein the process laser beam alone is not sufficiently absorbed in the non-absorptive material to process the non-absorptive material; and directing the assist laser beam and the process laser beam at a target location on the workpiece such that the assist laser beam modifies a property of the non-absorptive material of the workpiece at the target location forming absorption centers and such that the process laser beam is coupled into the absorption centers formed in the non-absorptive material at the target location to complete processing of the non-absorptive material at the target location.

Consistent with another embodiment, a multiple-beam laser processing system is provided for processing a workpiece made of a non-absorptive material. The multiple-beam laser processing system includes an assist laser for generating an assist laser beam with a first wavelength and a first pulse duration. The non-absorptive material of the workpiece is sufficiently absorptive of the assist laser beam with the first wavelength and the first pulse duration to modify a property of the non-absorptive material. The multiple-beam laser processing system also includes a process laser for generating a process laser beam with a second wavelength and a second pulse duration. At least one of the first and second wavelengths and the first and second pulse durations are different, and the process laser beam alone is not sufficiently absorbed in the non-absorptive material of the workpiece to process the non-absorptive material. The multiple-beam laser processing system further includes a beam combiner for directing the assist laser beam from the assist laser and the process laser beam from the process laser at a target location on the workpiece such that the assist laser beam with the first wavelength and the first pulse duration modifies a property of the non-absorptive material of the workpiece at the target location forming absorption centers and such that the process laser beam with the second wavelength and the second pulse duration is coupled into the absorption centers formed in the non-absorptive material at the target location to complete processing of the non-absorptive material at the target location.

Consistent with a further embodiment, a method is provided for multiple-beam laser processing of a workpiece including at least one layer of material. The method includes: generating an assist laser beam with a first wavelength and a first pulse duration, wherein the assist laser beam at the first wavelength and the first pulse duration, by itself, is not able to complete processing of the workpiece; generating a process laser beam with a second wavelength and a second pulse duration, wherein at least one of the first and second wavelengths and the first and second pulse durations are different, and wherein the process laser beam at the second wavelength and the second pulse duration, by itself, is not able to complete processing of the workpiece; and directing the assist laser beam and the process laser beam at a target location on the workpiece such that the assist laser beam modifies a property and/or a geometry of the at least one layer of material to facilitate the process laser beam completing processing of the workpiece at the target location.

Consistent with yet another embodiment, a multiple-beam laser processing system is provided for processing a workpiece. The multiple-beam laser processing system includes a first laser for generating a first laser beam with a first wavelength and a first pulse duration, wherein the first laser beam at the first wavelength and the first pulse duration, by itself, is not able to complete processing of the workpiece. The multiple-beam laser processing system also includes a second laser for generating a second laser beam with a second wavelength and a second pulse duration. At least one of the first and second wavelengths and the first and second pulse durations are different. The second laser beam at the second wavelength and the second pulse duration, by itself, is not able to complete processing of the workpiece. A beam combiner directs the first laser beam from the assist laser and the second laser beam from the process laser at a target location on the workpiece such that the first laser beam with the first wavelength and the first pulse duration modifies a property and/or a geometry of the at least one layer of material to facilitate the second laser beam completing processing of the workpiece at the target location.

BRIEF DESCRIPTION OF THE DRAWINGS

These and other features and advantages will be better understood by reading the following detailed description, taken together with the drawings wherein.

DETAILED DESCRIPTION

Figure 1:
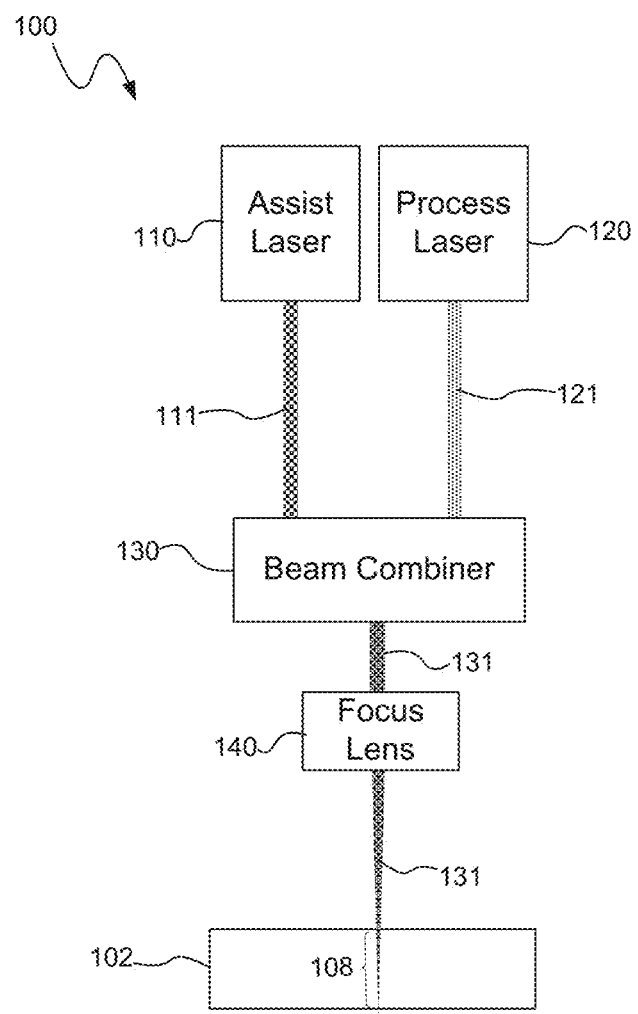
FIG. 1 is a schematic diagram of a multiple-beam laser processing system, consistent with an embodiment of the present disclosure.

Multiple-beam laser processing, consistent with embodiments of the present disclosure, may be performed on a workpiece using at least first and second laser beams with different characteristics (e.g., wavelengths and/or pulse durations). In some applications, the workpiece is made of a non-absorptive material, and an assist laser beam is directed at a target location on or within the workpiece to modify a property of the non-absorptive material, which forms absorption centers. A process laser beam is directed at the target location and is coupled into the absorption centers formed in the non-absorptive material to complete processing of the material. The assist laser beam and the process laser beam individually are not capable of completely processing the non-absorptive material of the workpiece but together (either simultaneously or sequentially) provide a synergy that enables processing of the non-absorptive material.

Multiple-beam laser processing may be used, for example, to drill holes in a substrate made of a transparent material such as alumina or other transparent ceramics. In other applications, multiple-beam laser processing may be used in melting applications such as micro-welding, soldering, and forming laser fired contacts. In these applications, the assist laser beam may be used to modify a property of the material being melted or to change the geometry of the parts.

Although example embodiments describe drilling holes in alumina, the multiple-beam laser processing systems and methods described herein may be used to process other types of transparent materials including, without limitation, sapphire and glass. The multiple-beam laser processing systems and methods described herein may also be used to process reflective materials that are non-absorptive because the materials reflect laser light at certain wavelengths. The multiple-beam laser processing systems and methods described herein may also be used with various processing techniques and applications including, without limitation, drilling, cutting, scribing, milling, welding, and the like.

As used herein, "processing" and "process" refer to a laser operation performed on a workpiece by ablating, melting, annealing (including all kinds of re-crystallization from solid-state phase to re-melting), or otherwise changing or modifying properties or characteristics of the material of the workpiece using a laser, and includes, without limitation, drilling, cutting, scribing, milling, and welding. As used herein, "non-absorptive" refers to a property of a material that results in a relatively small amount of laser energy being absorbed at certain wavelengths, for example, because the material is reflective or transparent to light at those wavelengths. As used herein, "transparent" refers to a property of a material that allows light within a certain wavelength range to pass through without enough absorption to process the material. As used herein, "absorption center" refers to a location in a non-absorptive material where the properties of the material have been modified (e.g., craters, roughening, optical damage, internal material defects, color centers, bulk material property changes, or increased temperature) such that light is more likely to be absorbed as compared to an unmodified region of the material. As used herein, "wavelength" refers to an approximate emission wavelength of a laser and may encompass a band or range of wavelengths around the stated wavelength. As used herein, "ultraviolet (UV) spectral range" refers to a spectral range of 10 nm to 380 nm, "visible spectral range" refers to a spectral range of 380 nm to 700 nm, and "infra-red spectral range" refers to a spectral range of 700 nm to 10.6 µm.

Referring to FIG. 1, a multiple-beam laser processing system 100, consistent with embodiments of the present disclosure, is used to process a workpiece 102 made of a non-absorptive material such as a transparent material or a reflective material. The multiple-beam laser processing system 100 generally includes an assist laser 110 for generating an assist laser beam 111 and a process laser 120 for generating a process laser beam 121. The lasers 110, 120 may generate pulsed laser beams with a single pulse performing a processing operation (e.g., drilling a hole) or a burst of multiple pulses performing a processing operation.

The multiple-beam laser processing system 100 further includes a beam combiner 130 for directing the laser beams 111, 121 to the same target location 108 on or within the workpiece 102. The multiple-beam laser processing system 100 may combine and direct the assist laser beam 111 and the process laser beam 121 simultaneously (as shown) or at different times. Directing the laser beams 111, 121 simultaneously may include any amount of overlap between the bursts or pulses of the laser beams 111, 121 and does not necessarily require the laser beams to have the same burst or pulse duration. The assist laser beam 111 may start before or during the process laser beam 121. The laser beams 111, 121 may also be directed to the workpiece 102 at different times, for example, with the assist laser beam 111 before the process laser beam 121.

One or more focus lenses 140 may be used to focus the assist laser beam 111 and the process laser beam 121, either together simultaneously as a combined laser beam 131 or individually at different times. The focus lens 140 may focus the beams, for example, above the surface of the workpiece 102, on the surface of the workpiece 102, or within the workpiece 102 depending upon the processing technique or application.

Although the illustrated embodiments show multiple lasers 110, 120 generating the assist laser beam 111 and the process laser beam 121, a multiple-beam laser processing method, consistent with embodiments of the present disclosure, may also be performed using the same laser source to produce both the assist laser beam 111 and the process laser beam 121. For example, an assist laser beam may be generated from a laser source with one set of parameters (e.g., a shorter wavelength and/or pulse duration) and a process laser beam may be generated from the same laser source with a different set of parameters (e.g., a longer wavelength and/or pulse duration). A single laser beam generated by a laser source may also be split and modified using different beam delivery systems to produce the assist laser beam and the process laser beam with distinct characteristics.

The multiple-beam laser processing system 100 may also include other components including, without limitation, beam delivery systems, a workpiece support, a motion stage, a control system, and/or a monitoring system. The types of lasers, beam delivery systems, and other components used in the multiple-beam laser processing system 100 may depend upon the particular processing application and/or the material being processed by the multiple-beam laser processing system 100.

The assist laser beam 111 and the process laser beam 121 individually are not capable of processing the workpiece 102 with a desired quality but have different characteristics that provide a synergy when used together either simultaneously or sequentially. The assist laser beam 111 has a wavelength and/or pulse duration capable of modifying a property of the material of the workpiece 102 at the target location 108 to form absorption centers, which change the light coupling properties of the material. The assist laser beam 111 may modify a property of the material by inducing damage in the material or other modifications that affect absorptivity (e.g., temperature changes). Although the assist laser beam 111 may be capable of inducing some damage, the assist laser beam 111 does not have sufficient pulse energy and power to complete the processing. The process laser beam 121 has a wavelength and/or pulse duration capable of coupling into the absorption centers to complete processing of the material of the workpiece 102, even though the process laser beam 121 might otherwise reflect from or transmit through the unmodified material of the workpiece 102 without enough absorption to process the material.

Although the process laser beam 121 may be capable of processing the non-absorptive material of the workpiece 102 by itself at a higher pulse energy and peak/average power, a higher pulse energy and peak/average power is inefficient and may also have undesired effects, such as excess removal of material and/or thermal damage, which adversely affects the processing control and quality. The use of the assist laser beam 111 to form the absorption centers thus seeds the coupling of the process laser beam 121 and allows the process laser beam 121 to complete the processing with a lower pulse energy and peak/average power, thereby improving efficiency and control and quality of the processing, as will be described in greater detail below. In one example of drilling 50 micron holes in 381 micron thick alumina, the peak power of the process laser may be less than 200 W when used with the assist laser compared to a peak power greater than 1 kW needed to perform the same processing operation using only the process laser by itself.

The characteristics of the assist laser beam 111 and the process laser beam 121 are different but complimentary and depend on the type of material as well as the type of processing application. In some applications, the wavelength and/or pulse duration of the assist laser beam 111 is shorter than the wavelength and/or pulse duration of the process laser beam 121. This allows the assist laser beam 111 to couple better into the non-absorptive material of the workpiece 102 to modify the material so that the longer wavelength and/or pulse duration of the process laser beam 121 can then couple into the modified material and do most of the material removal. In one particular application for drilling holes in an alumina workpiece, for example, the assist laser beam may have a wavelength of about 532 nm (i.e., a green laser) and a pulse duration of about 1 ns and the process laser beam may have a wavelength of about 1070 nm (i.e., an IR laser) and a pulse duration of 100 ns or greater (e.g., greater than 10 µs). Specific examples of laser processing with a green assist laser and an IR process laser are described in greater detail below.

In other embodiments, various combinations of assist and process laser beams may be used. The assist laser beam wavelength may be in the UV spectral range (e.g., 266 or 355 nm) and the process laser beam wavelength may be in the visible spectral range (e.g., 532 nm). The assist laser beam wavelength may be in the UV spectral range (e.g., 266 or 355 nm) and the process laser beam wavelength may be in the IR spectral range (e.g., 1064 or 1070 nm). The assist and process laser beam wavelengths may also be different wavelengths within the same spectral range such as within the UV spectral range (e.g., 266 nm and 355 nm). The assist and process laser beams with these different wavelengths may also have different pulse durations, for example, the assist laser beam may have a shorter pulse duration than the process laser beam. In further examples, the assist and process laser beam wavelengths may be the same (e.g., IR wavelengths) with different pulse durations such as a short pulse (e.g., less than 10 ns) for the assist laser and a long pulse (e.g., greater than 1 μs) for the IR laser. For example, the assist laser may be an IR laser with short pulses (e.g., a 1 ns or picoseconds IR laser) and the process laser may be a 100 ns IR laser or QCW IR laser.

Figure 2:
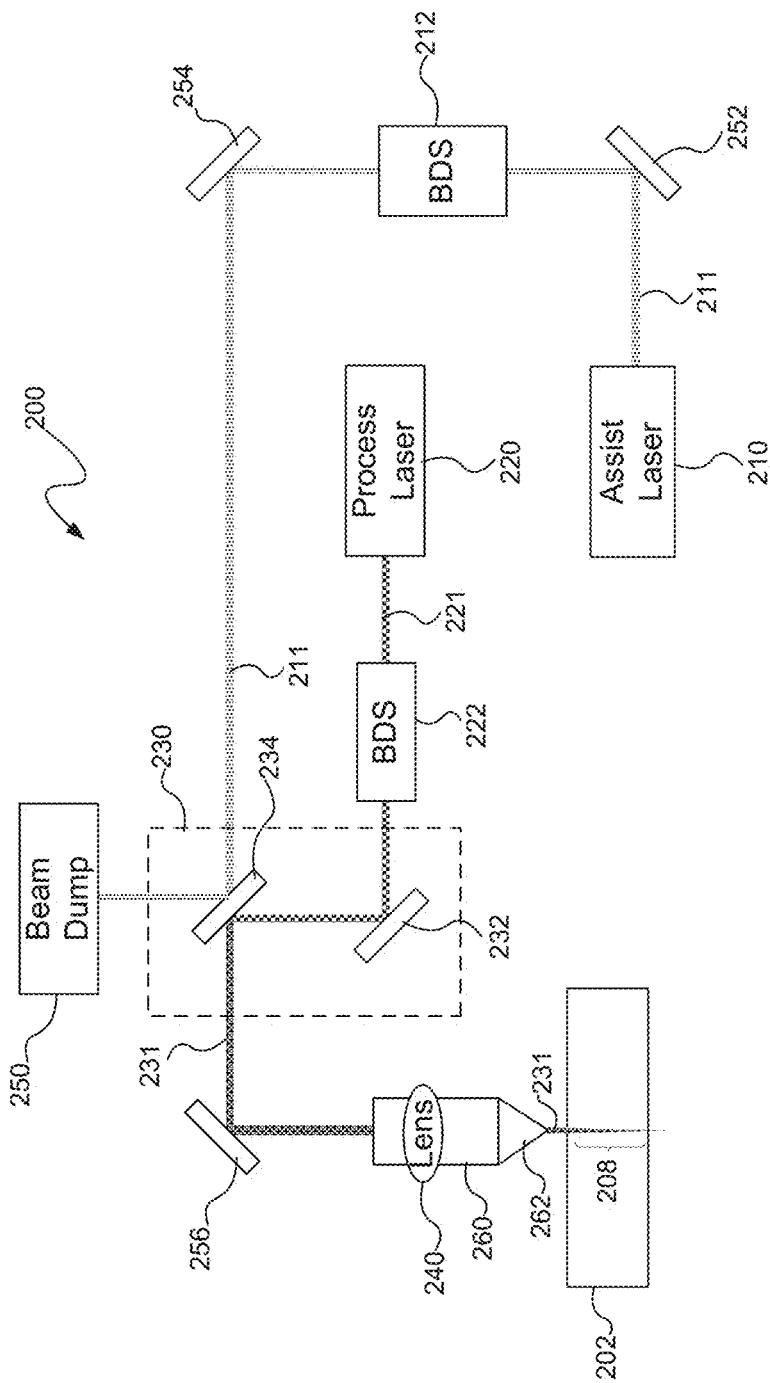
FIG. 2 is a schematic diagram of a multiple-beam laser processing system, consistent with another embodiment of the present disclosure.

Referring to FIG. 2, another embodiment of a multiple-beam laser processing system 200 is shown in greater detail. This embodiment of the multiple-beam laser processing system 200 includes an assist laser 210 for generating an assist laser beam 211 (e.g., a green laser of about 532 nm) and a process laser 220 for generating a process laser beam 221 (e.g., an IR laser of about 1060 to 1070 nm). The assist and process lasers 210, 220 are optically coupled to respective beam delivery systems 212, 222 for modifying the assist and process laser beams 211, 221, respectively, before combining the beams. The multiple-beam laser processing system 200 further includes a beam combiner 230, a focus lens 240, a laser processing head 260, and one or more reflectors or mirrors 252, 254, 256 for directing the assist and process laser beams 211, 221 as a combined laser beam 231 to the same target location 208 on or within a workpiece 202. Although the illustrated embodiment shows the assist and process laser beams 211, 221 being combined simultaneously, the beams 211, 221 may also be combined such that the beams are directed to the same target location 208 at different times.

In the illustrated embodiment, the assist laser 210 may be a rare-earth-doped fiber laser such as a GLP Series pulsed green fiber laser available from IPG Photonics Corporation. The process laser 220 may also be a rare-earth-doped fiber laser such as YLP Series pulsed ytterbium fiber laser or a QCW Series single-mode ytterbium fiber laser available from IPG Photonics Corporation. In other embodiments, the lasers 210, 220 may include diode pumped solid state (DPSS) lasers, excimer lasers, gas lasers, and other types of lasers known to those skilled in the art.

The assist laser beam delivery system 212 may include a variable telescope to provide beam expansion and divergence control of the assist laser beam 211. In particular, the divergence of the assist laser beam 211 may be controlled to have an optimized numerical aperture (NA) to create substantially the same focal plane as the process laser beam 221 after the laser beams 211, 221 are combined. The process laser beam delivery system 222 may include a collimator such as, for example, a collimating lens with a focal length of 100 mm. Alternatively or additionally, the beam delivery systems 212, 222 may also include other optics for modifying and/or directing the laser light to the desired location. Such optics may include, without limitation, beam expanders, beam collimators, beam shaping lenses, reflectors, masks, beamsplitters and scanners (e.g., a galvanometer).

In the illustrated embodiment, the beam combiner 230 includes reflectors or mirrors 232, 234 for selectively reflecting the wavelengths of the assist and process laser beams 211, 221, respectively, such that the beams 211, 221 are directed along the same optical axis. The first minor 232 is coated to reflect the wavelength of the process laser beam 221, and the second minor 234 is coated on one side to reflect the wavelength of the process laser beam 221 and uncoated on the other side to allow at least a portion of the assist laser beam 211 to pass through. Thus, the second mirror 234 combines both beams 211, 221. In an embodiment with a green assist laser beam 211 and an IR process laser beam 221, for example, the first minor 232 may be IR coated and the second minor 234 may be IR coated on one side and uncoated on the other side. The uncoated side of the second minor 234 may still reflect a portion of the assist laser beam 211 to a beam dump 250. Other configurations of the beam combiner 230 are also within the scope of the present disclosure.

The minors 252, 254, 256 may be coated to reflect the desired wavelengths of the laser beams 211, 221. In an embodiment with a green assist laser beam 211 and an IR process laser beam 221, for example, the mirrors 252, 254 reflecting the green laser beam may be 532 nm or green coated mirrors capable of reflecting the green assist laser beam 211 and the mirror 256 may be a dual IR-green coated mirror capable of reflecting both the green assist laser beam 211 and the IR process laser beam 221. In at least one embodiment, the transmission of the multiple-beam laser processing system 200 may be 40% for the assist laser beam 211 and 90% for the process laser beam 221.

Although the illustrated embodiment shows free space delivery using minors, other optical components may also be used to deliver and/or combine the lasers. For example, one or more fibers may be used to deliver the laser beams to the laser processing head 260. In this embodiment, the lasers may be combined by focusing the lasers to the same location 208 on or within the workpiece 202.

The focus lens 240 may be a singlet focusing lens such as, for example, a lens with an 88 mm focal length and coated for IR. The focus lens 240 may be capable of focusing the laser beams to a beam spot with a diameter or dimension in a range of about 30 to 40 μm. In other embodiments, the beam delivery systems 212, 222 and focus lens 240 may be capable of focusing the lasers 211, 221 to an even smaller beam spot, for example, as small as 15 μm or smaller.

In the illustrated embodiment, the laser processing head 260 includes a gas assist nozzle 262 to direct a pressurized gaseous medium to the workpiece 202 together with the laser beams to facilitate laser processing, for example, when using a thermal cutting process where the gas helps to expel molten material. The gaseous medium may include, for example, oxygen ($O_2$). In other embodiments, the gaseous medium may be an inert gas, such as nitrogen, argon or helium.

Figure 3A:
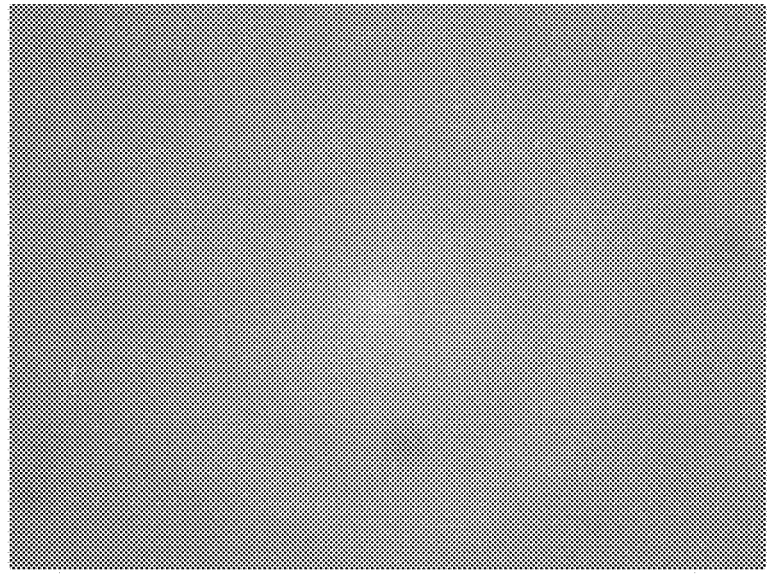
FIGS. 3A-3C are images illustrating one example of multiple-beam laser processing to enhance laser coupling in an alumina workpiece.
Figure 3B:
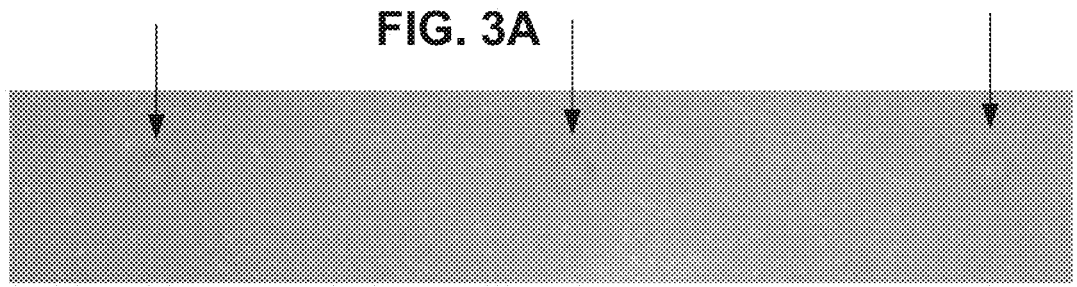

FIGS. 3A-3B illustrate one example of multiple-beam laser processing using the system 200 shown in FIG. 2 for enhanced coupling into an alumina workpiece. In this example, the assist laser is a 1 ns green fiber laser (532 nm) with 100 μJ maximum pulse energy and 10 W maximum power at a repetition rate of 100 kHz ("green laser") and the process laser is a 100 ns ytterbium fiber laser (1064 nm) with 1 mJ maximum pulse energy and 100 W maximum power at a repetition rate of 100 kHz ("IR laser"). The green laser and the IR laser are directed separately and together at the alumina in 1 ms bursts.

Figure 3C:
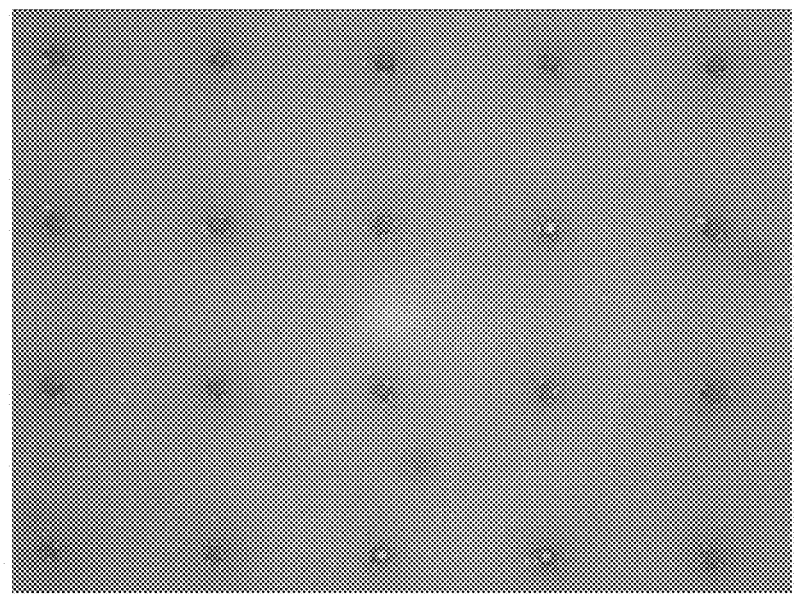

FIG. 3A shows the alumina workpiece after a 1 ms burst of only the IR laser at 7 W on target at 40 kHz and with 40 μm spot size on target. As shown, the IR laser at this lower power level fails to couple with the alumina and no damage occurs at the surface. FIG. 3B shows the alumina workpiece after a 1 ms burst of only the green laser at 4 W on target at 100 kHz and with a 15 μm spot size on target. As shown, the green laser at this power level consistently created surface damage on the alumina in the form of shallow craters of about 8 µm diameter and a few microns deep. FIG. 3C shows the alumina workpiece after a 1 ms burst of both the green laser and the IR laser. As shown, the green laser and the IR laser applied together consistently couple into the surface of the alumina to form craters of about 35-40 µm diameter and about 30 µm deep. Thus, simultaneously processing with the 1 ns green laser significantly enhanced the coupling of the 100 ns IR laser to alumina.

FIGS. 4A-4H illustrate another example of multiple-beam laser processing using the system 200 shown in FIG. 2 for percussion drilling relatively small holes in a 380 µm alumina workpiece. In this example, the assist laser is a 1 ns green fiber laser (532 nm) with 100 µJ maximum pulse energy and 10 W maximum power at a repetition rate of 100 kHz ("green laser") and the process laser is a 100 ns ytterbium fiber laser (1064 nm) with 1 mJ maximum pulse energy and 100 W maximum power at a repetition rate of 100 kHz ("IR laser"). In this example, the lasers are gas assisted with an $O_2$ gas at 60 psi.

Figure 4A:
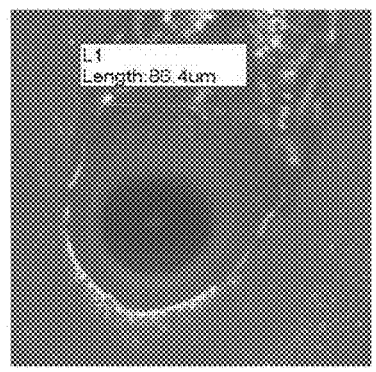
FIGS. 4A-4H are images illustrating another example of multiple-beam laser processing for percussion drilling relatively small holes in an alumina workpiece.
Figure 4C:
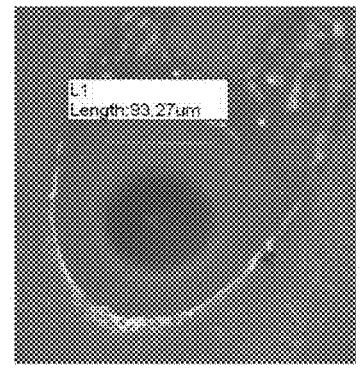
Figure 4B:
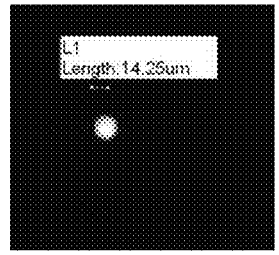
Figure 4D:
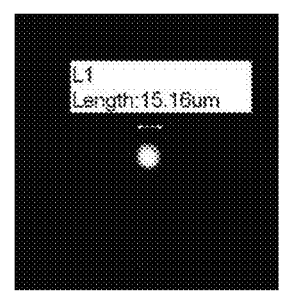

FIGS. 4A-4D illustrate the effect of using the green laser with the IR laser at a higher power. FIGS. 4A and 4B show the top and bottom of the alumina workpiece after a 50 ms burst of the green laser at 4 W on target and the IR laser at 90 W power on target at 100 kHz and with a spot size of about 35-40 µm. This results in a hole drilled through the alumina workpiece with an entrance (FIG. 4A) of about 86.4 µm and an exit (FIG. 4B) of about 14.25 µm. FIGS. 4C and 4D show the top and bottom of the alumina workpiece after a 50 ms burst of only the IR laser at 90 W power on target at 100 kHz and with a spot size of about 35-40 µm. As shown, this results in a hole drilled through the alumina workpiece that is not significantly different than the hole drilled with both the green laser and the IR laser (FIGS. 4A and 4B). At higher pulse energy and average power of the IR laser, therefore, the effect of the green laser is insignificant.

Figure 4E:
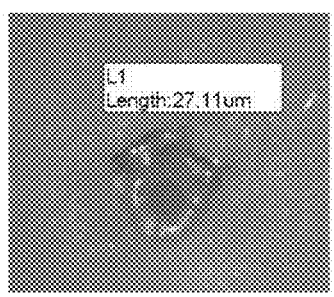
Figure 4G:
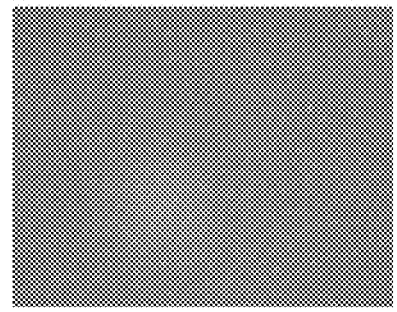
Figure 4F:
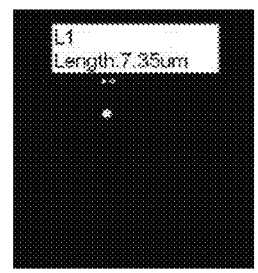
Figure 4H:
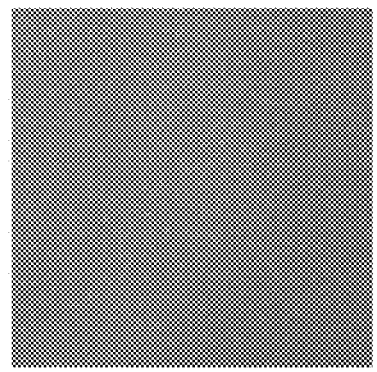

FIGS. 4E-4H illustrate the effect of using the green laser with the IR laser at lower power. FIGS. 4E and 4F show the top and bottom of the alumina workpiece after a 50 ms burst of the green laser at 4 W on target and the IR laser at 14 W power on target at a repetition rate of 40 kHz and with a spot size of about 35-40 µm. This results in a hole drilled through the alumina workpiece with an entrance (FIG. 4E) of about 27.11 µm and an exit (FIG. 4F) of about 7.35 µm. FIG. 4G and 4H show the top and bottom of the alumina workpiece after a 50 ms burst of only the IR laser at 14 W power on target at 40 kHz and with a spot size of about 35-40 µm. As shown, the lower power IR laser fails to couple with the alumina workpiece. Even when the lower power IR laser couples, the holes may not pass through the alumina workpiece. At lower pulse energy and average power of the IR laser, therefore, the effect of the green laser is significant and results in the IR laser coupling with the alumina where the IR laser otherwise would not couple consistently with the alumina. This example further illustrates that using the green assist laser with the lower power IR laser allows drilling smaller holes (e.g., less than 30 µm) than when using the higher power IR laser by itself. Using the combination of the green laser and the lower power IR laser, an array of holes may be drilled repeatedly and consistently through the alumina workpiece with a consistent small size having an entrance of about 27 µm and an exit of about 7.5 µm ±2 µm.

FIGS. 5A-5L illustrate a further example of multiple-beam laser processing using the system 200 in FIG. 2 for single shot hole drilling in an alumina workpiece. In this example, the assist laser is a 1 ns green fiber laser (532 nm) with 100 µJ maximum pulse energy and 10 W maximum power at a repetition rate of 100 kHz ("green laser") and the process laser is a quasi continuous wave (QCW) single mode ytterbium fiber laser (1064 nm) with 15 J maximum pulse energy and 1500 W maximum peak power ("QCW IR laser"). In this example, the QCW IR laser is delivered with a single shot having a 0.2 ms pulse duration, a spot size of about 35-40 µm, and gas assisted with an $O_2$ gas at 70 psi. and the green laser is delivered as a 10 ms burst running at the same time as the single shot of the QCW IR laser.

Figure 5A:
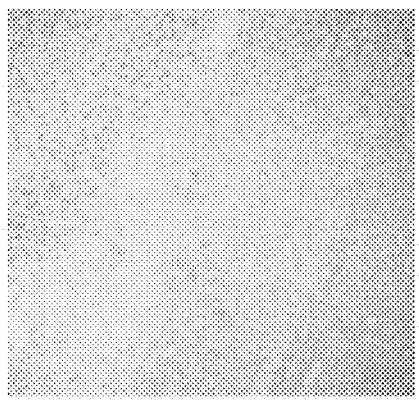
FIGS. 5A-5L are images illustrating a further example of multiple-beam laser processing for single shot hole drilling in an alumina workpiece.
Figure 5C:
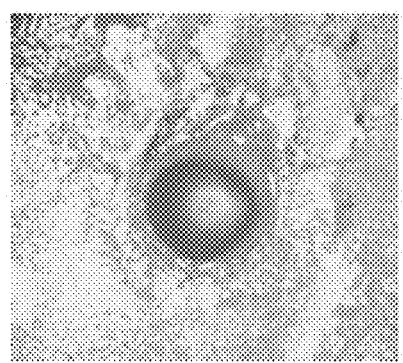
Figure 5B:
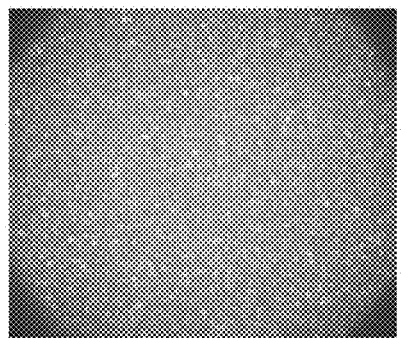
Figure 5D:
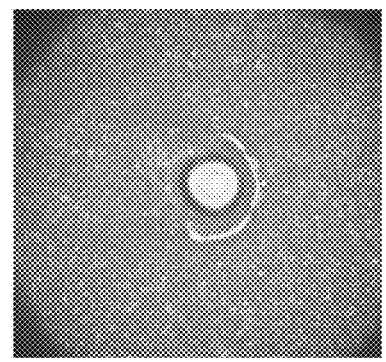

FIGS. 5A-5D illustrate the effect of the IR laser only on the alumina workpiece at different power levels. FIGS. 5A and 5B show the top and bottom of the alumina workpiece after a single shot (0.2 ms) of the QCW IR laser with 30% diode current. As shown, no coupling of the IR laser occurs at this lower power level. FIGS. 5C and 5D show the top and bottom of the alumina workpiece after a single shot (0.2 ms) of the QCW IR laser with 50% diode current. At this power level, the IR laser starts to couple with the alumina, as shown by the entrance and exit holes; however, the coupling is not repeatable (e.g., about 30% of the time). Even at 70% diode current, the coupling of the QCW IR laser may be inconsistent. Moreover, when coupling occurs at this higher power level, the holes are larger with an entrance hole of about 65 µm and an exit hole of about 40 µm.

Figure 5E:
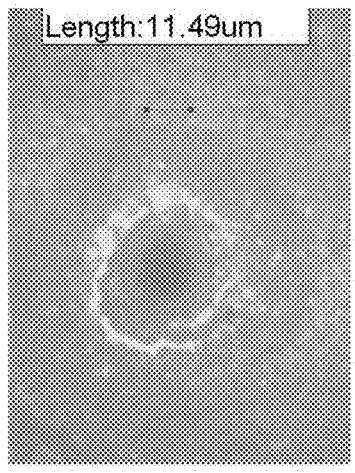
Figure 5G:
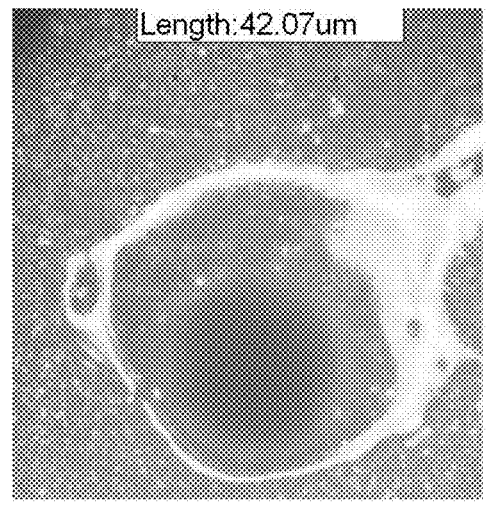
Figure 5F:
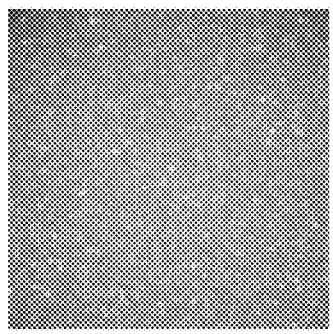
Figure 5H:
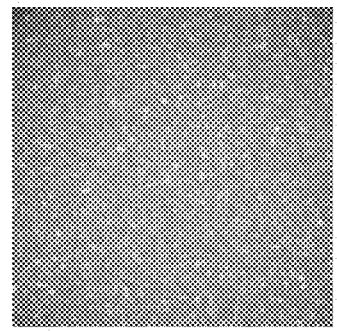

FIGS. 5E and 5F show the top and bottom of the alumina workpiece after a 10 ms burst of only the green laser. As shown, the green laser causes some shallow damage at the surface of the alumina but fails to drill a hole through to the other side of the alumina. FIGS. 5G and 5H show the top and bottom of the alumina workpiece after a 10 ms burst of the green laser with a single shot of the QCW IR laser at 10% diode current. As shown, the QCW IR laser couples with the alumina but does not drill a hole through the alumina.

Figure 5I:
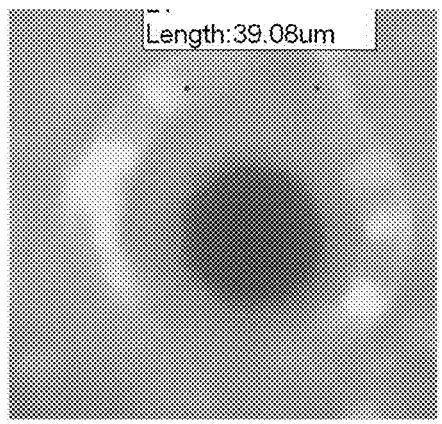
Figure 5K:
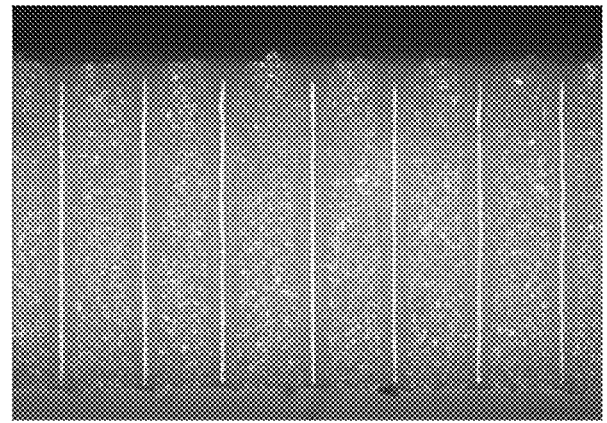
Figure 5J:
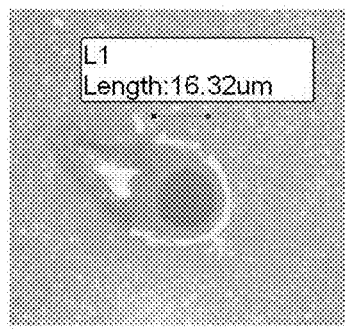
Figure 5L:
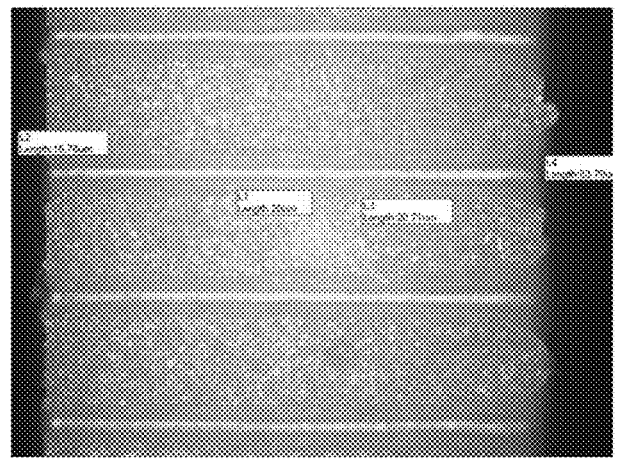

FIGS. 5I and 5J show the top and bottom of the alumina workpiece after a 10 ms burst of the green laser with a single shot of the QCW IR laser at 15% diode current. As shown the IR laser at this power level (about 200 W peak power), when combined with the green laser, couples with the alumina and drills a hole through the alumina workpiece with an entrance having a dimension of about 39.08 µm (FIG. 5I) and an exit (FIG. 5J) having a dimension of about 16.32 µm. FIGS. 5K and 5L further show the holes extending through the 380 micron thick alumina workpiece. As shown in FIG. 5L, the holes have a relatively consistent diameter (e.g., about 20 µm) through the alumina workpiece. Thus, a single shot of a QCW IR laser at a lower power assisted with the simultaneous triggering of a 1 ns green laser is capable of drilling small holes (e.g., about a 40 µm entrance and a 16 µm exit) with increased repeatability of coupling. Using single shot drilling with a QCW IR laser and a green assist laser also allows holes to be drilled at a high speed (e.g., over 100 holes/sec).

In another example, an embodiment of the multiple-beam laser processing system and method described herein has been used to drill holes with a diameter of 10 microns through an alumina workpiece having a thickness of 100 microns. In a further example, an embodiment of the multiple-beam laser processing system and method described herein has been used to drill holes with a diameter of 30 microns through an alumina workpiece having a thickness of 635 microns.

Figure 6:
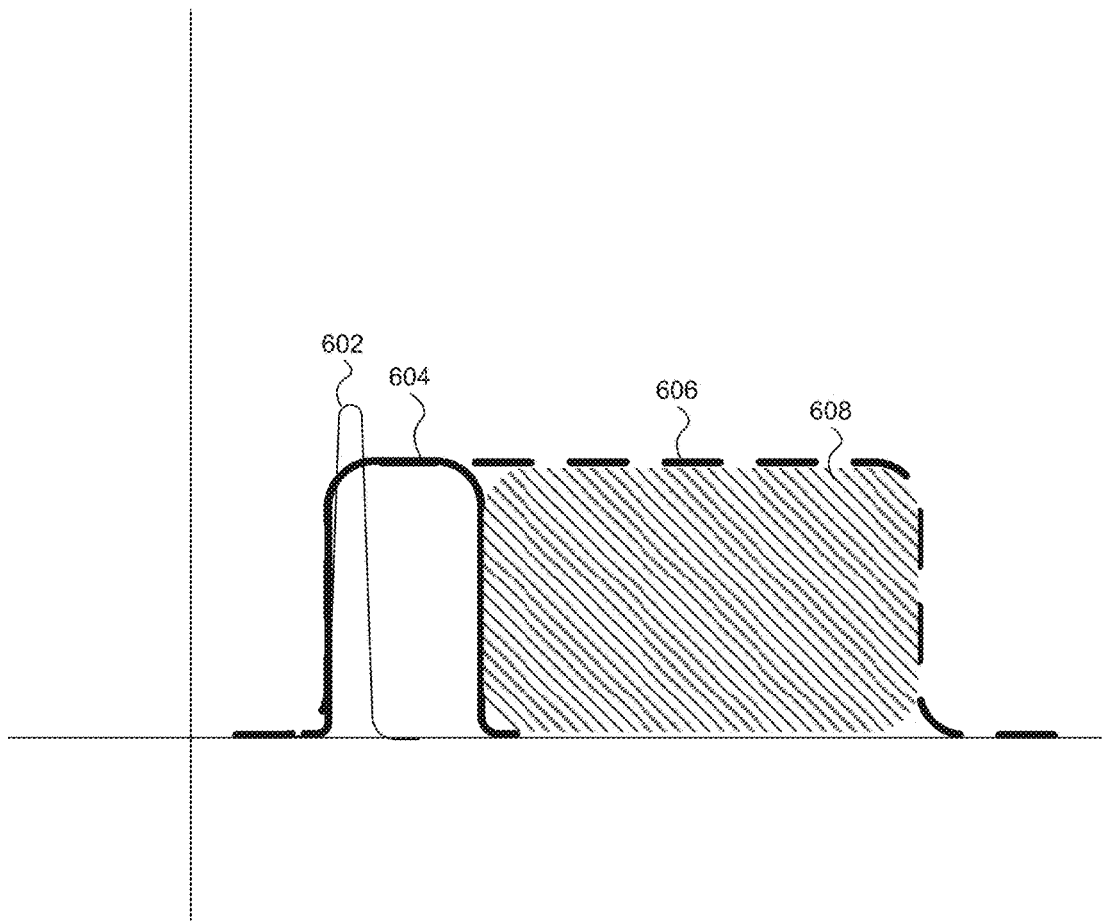
FIG. 6 is a pulse width diagram illustrating the reduction in laser power that is possible when using an assist laser beam with a process laser beam, consistent with embodiments of the present disclosure.

FIG. 6 illustrates one way that a reduction of laser power is possible when using an assist laser beam together with a process laser beam. In this example, the shorter assist laser beam pulse 602 (e.g., from a green laser) together with the process laser beam pulse 604 (e.g., a pulse of 10 µs to 50 µs from an IR laser) allows the process laser beam pulse 604 to drill a hole in a workpiece as discussed above. Without using the assist laser beam, a wider laser beam pulse 606 (e.g., a pulse of about 400 µs from an IR laser) may be required to increase pulse energy and provide sufficient absorption to drill a hole in the workpiece. The cross-hatched region 608 represents the amount of additional pulse energy for the absorption when the assist laser beam is not used.

Accordingly, the use of the assist laser beam and the process laser beam allows non-absorptive material to be processed consistently with lower power (e.g., at least about 10% less power than needed with a single IR laser) and higher quality (e.g., smaller drilled holes). Moreover, the use of the assist laser beam and the process laser beam allows consistent coupling (e.g., for hole drilling) without the need for other coupling enhancers such as a coating layer.

Although the multiple-beam laser processing system is described above as using the assist laser beam and the process laser beam in a certain way, a multiple-beam laser processing system may include two or more lasers generating laser beams with different characteristics where each of the laser beams is not able to complete processing by itself but together the laser beams may be used to perform a laser processing operation. The multiple-beam laser beams may be used simultaneously or with a controlled delay with each of the laser beams modifying a property and/or geometry of the workpiece in a different way to facilitate the laser processing of the workpiece. In addition to drilling holes through transparent materials, multiple-beam laser processing systems and methods may also be used to enhance laser processing for other applications, for example, for other types of non-absorptive materials (e.g., reflective materials) and/or where it may be desirable to lower the power of a laser being used to perform the laser processing. Such applications include, without limitation, melting applications such as micro-welding, soldering, and forming laser fired contacts, as will be described in greater detail below.

In one application, a multiple-beam laser processing system and method may be used to perform micro-welding of highly reflective materials such as copper. In particular, copper has high reflectivity to standard near IR beams (e.g., 1064 nm) with pulse durations in the nanosecond regime and longer. To facilitate micro-welding of copper (and other similar highly reflective materials), the multiple-beam laser processing system and method may use a first or assist laser beam at a lower wavelength and/or with a shorter pulse duration to couple more easily with the material. Using a green laser, for example, may lead to local vaporization, which increases the temperature of the material dramatically and brings the material to a molten state, thereby lowering reflectivity. The multiple-beam laser processing system and method may use a second or process laser beam (e.g., an IR laser beam) to perform the melting and welding across the thickness of the workpiece (e.g., across the layers of material being welded). Reducing the reflectivity with the first laser allows a greater portion of the intensity of the second laser to be absorbed in the reflective material (as compared to using the second laser by itself).

One example of micro-welding a 25 µm copper plate to another 25 µm copper plate is illustrated in FIGS. 7 and 7A-7G. In this example, the first laser is a quasi-continuous wave (QCW) single-mode ytterbium IR fiber laser with a maximum peak power of 1500 W, such as the YLM-150/1500-QCW laser available from IPG Photonics Corp., and the second laser is a pulsed green fiber laser with an average power of 10 W, such as a GLP series laser available from IPG Photonics Corp. The QCW IR fiber laser was used with an 85 mm collimator and an 80 mm objective and with a laser cutting head with no gas assist. In this example, the IR fiber laser is operated in gate mode with 35% peak power, with a typical peak/average power (at laser) of 62W/1.8 W, a repetition rate of 40 Hz, and typical pulse durations of 1.1 ms-1.5 ms. In this example, the green fiber laser is operated with a 60%-70% current, a repetition rate of 100 kHz, a pulse duration of ~1 ns, and 160 mW-300 mW on target. The IR fiber laser and the green fiber laser are triggered at approximately the same time and the workpiece stage is moved at about 1 mm/s.

Figure 7:
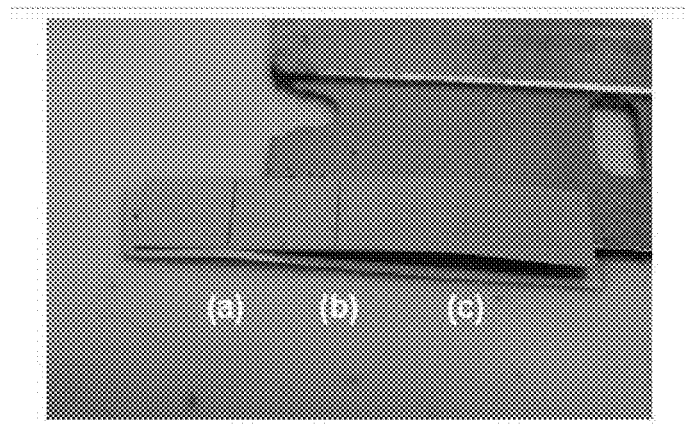
FIG. 7 is a photograph of strips of copper comparing the results of laser welding using single laser beams and using multiple-beam laser processing, consistent with an embodiment of the present disclosure.
Figure 7A:
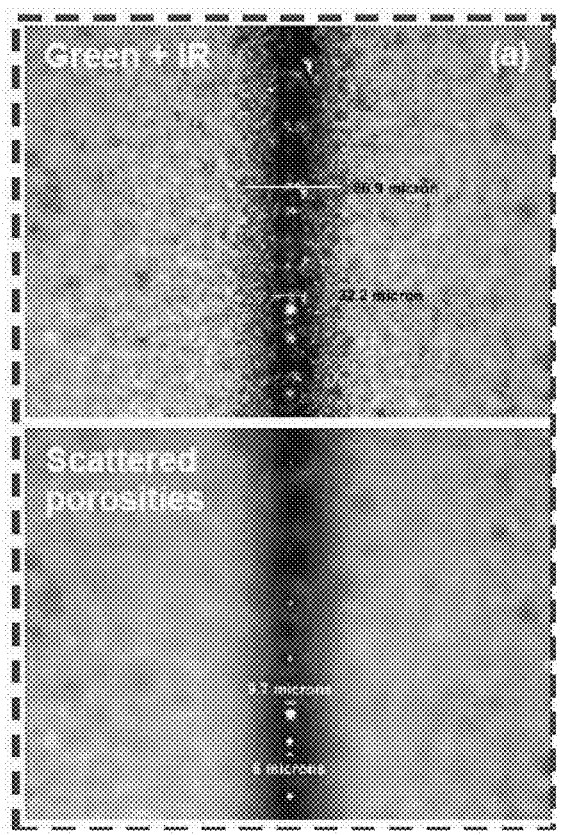
FIGS. 7A-7E are micrographs showing the weld lines on the strips of copper shown in FIG. 7.
Figure 7B:
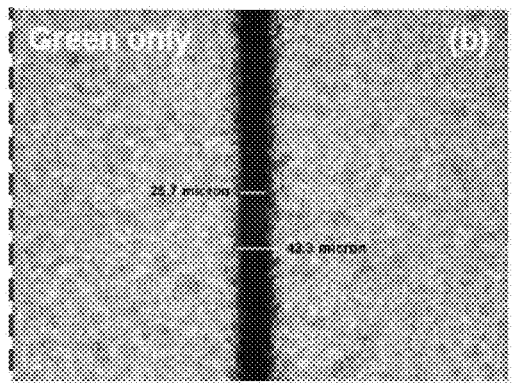
Figure 7C:
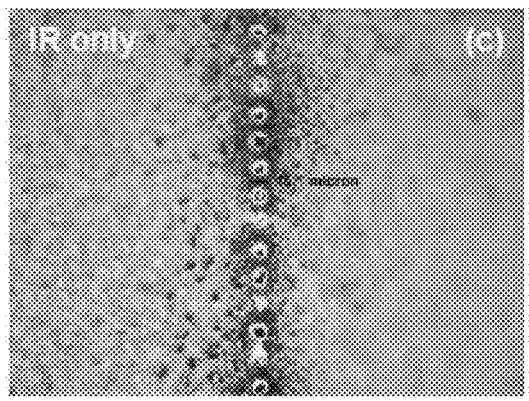
Figure 7D:
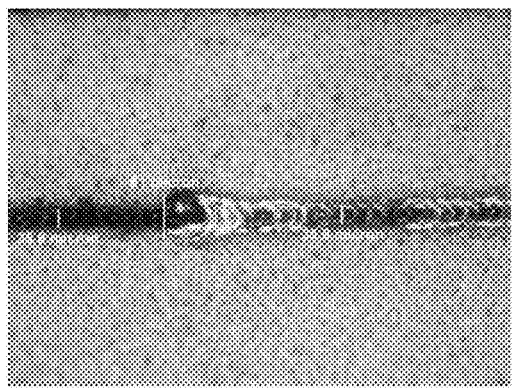
Figure 7E:
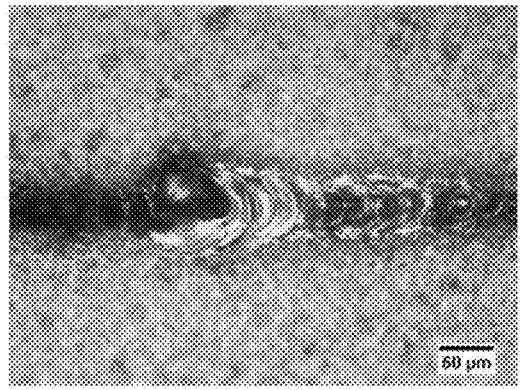

FIG. 7 shows strips of 25 µm copper that has been processed using (a) both the green and IR lasers; (b) by only the green laser; and (c) by only the IR laser. FIGS. 7A-7C are micrographs showing the results of each of these respective laser processing operations in greater detail. As shown, welding occurred only when using both the green and IR lasers. The combination of the green and QCW IR laser created weld lines over 10 mm long segments with minimal variation of spot size across the weld lines, as shown in FIGS. 7D and 7E. Porosities may be reduced by reducing green laser power.

In another application, a multiple-beam laser processing system and method may be used to perform micro-welding by modifying a geometry of at least one of the layers. In this application, the first or assist laser beam may be used to machine a small or narrow opening through the top layer of material (e.g., a copper foil), for example, in the form of one or more slits or micro holes. The opening allows enough light through to another layer of material (e.g., another copper foil) such that the first layer welds or fuses into the opening, closing the opening and allowing for welding into the other layer of material. The first laser beam may also be used to cut a narrow slit (or series of micro holes) through both layers of material and the second laser beam may be used to weld the two layers by propagating the laser light through the slit and conducting heat laterally. In this application, a green laser beam (355 nm) or a UV laser beam (266 nm) may be used to machine the slits/holes and an IR laser beam may be used to perform the welding. A shorter wavelength (i.e., 266 nm) may be advantageous for the first laser to machine narrower slits/holes.

Figure 8:
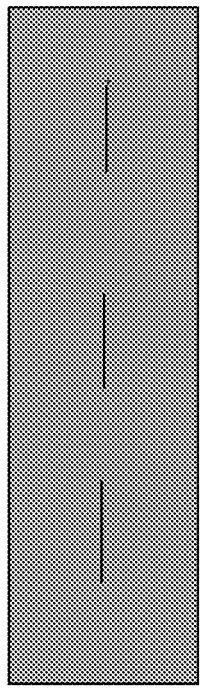
FIG. 8 is a schematic diagram illustrating a series of slits machined in a copper foil for use in a welding operation using multiple-beam laser processing, consistent with an embodiment of the present disclosure.
Figure 8A:
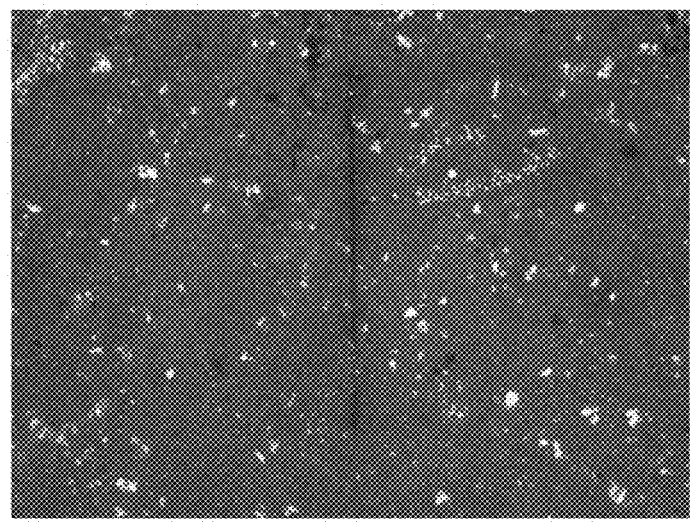
FIGS. 8A and 8B are micrographs illustrating a slit and a weld, respectively, formed in a copper foil using multiple-beam laser processing, consistent with an embodiment of the present disclosure.
Figure 8B:
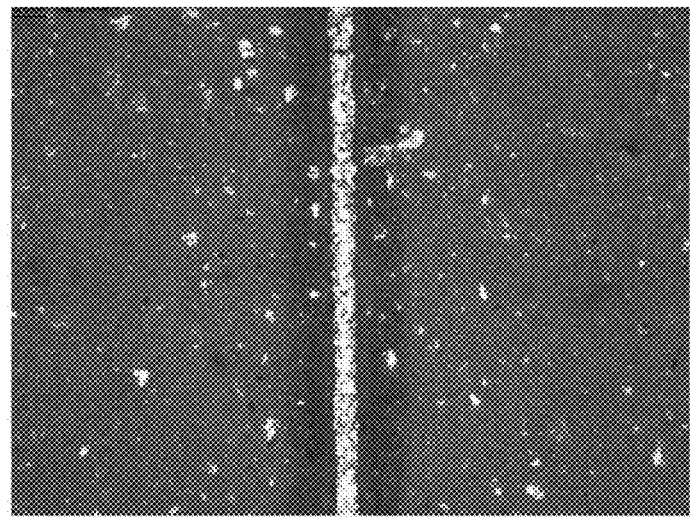
Figure 8C:
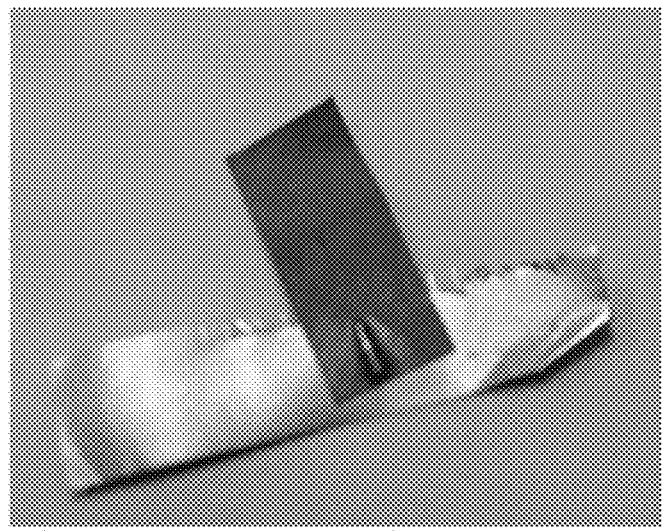
FIG. 8C is a photograph illustrating copper foils successfully welded using multiple-beam laser processing, consistent with an embodiment of the present disclosure.
Figure 8D:
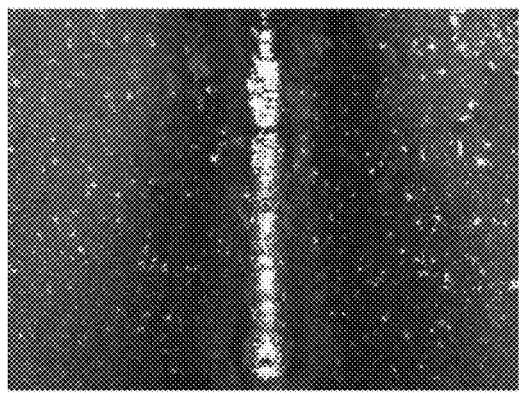
FIGS. 8D and 8E are micrographs of the top and bottom, respectively, of copper foils welded using multiple-beam laser processing, consistent with an embodiment of the present disclosure.
Figure 8E:
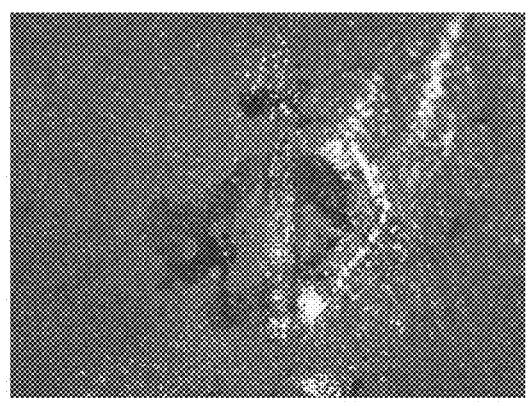

Another example of welding 25 µm copper foil to another piece of 25 µm copper foil is illustrated in FIGS. 8 and 8A-8E. In this example, a QCW IR fiber laser with a 15 µm single mode fiber and a UV laser (266 nm) were used. In this example, the UV laser was used to cut a series of slits having a length of 1 mm and width of 10 µm, as shown in FIG. 8, and the QCW IR fiber laser was used to perform the welding by penetrating through the slits. FIG. 8A is a micrograph illustrating a slit prior to welding. The QCW IR fiber laser was operated with a 1.9 ms long shaped pulse with a varying off time between pulses to change frequency, a traverse speed of 500 µm/s, and a weld bead width of 38 µm. FIG. 8B is a micrograph illustrating a top side of the slit after welding. FIG. 8C shows a successful weld of 25 µm copper foil to another piece of 25 µm copper foil using this technique. FIGS. 8D and 8E are micrographs illustrating the top and bottom foils, respectively, after performing a 2.0 mm weld overlapping the 1.0 mm slit on both ends. As shown in FIG. 8E, the resulting penetration to the bottom foil was only as long as the slit.

In these micro-welding applications, the first or assist laser beam allows much less IR laser power for the process laser beam than would be needed if an IR laser beam were used by itself. An IR laser beam used by itself may not be sufficient to perform some welding operations or it may be difficult to control depth of affectation when using the power needed to overcome the reflectivity of the material being welded. The multiple-beam laser processing system and method may be used to perform micro-welding applications on plates that are several hundreds of microns thick or on thin foils that are less than 100 microns.

In the micro-welding applications described above, the first laser beam may be used to perform the first laser beam processing operations (i.e., coupling to modify a property of the material or machining to modify a geometry of the material) in all locations and then the second laser beam may be used to perform the second laser beam processing operations (i.e., the welding) in all locations. Alternatively, after the first laser beam processing operation in each location, the second laser beam processing may be performed in that location with a defined time delay. For the technique of machining and then welding, performing the welding at the same time as the machining may be advantageous because the absorption of the IR laser is better in the molten material formed by the machining, thereby requiring less IR power to overcome reflectivity. The machining may also be performed in advance of the welding.

In a further application, a multiple-beam laser processing system and method may be used to form laser fire contacts, for example, on solar cells. In this application, the first laser beam may be used to drill a hole through a dielectric layer and then the second laser beam may be used to fill in the hole. Alternatively, the first laser beam (e.g., a green laser beam) may be used to provide enough absorption to bring a temperature close to a melting temperature and the second laser beam (e.g., an IR laser) may be used to form an ohmic contact by driving a metal through a dielectric layer to form a contact with silicon. Using the first laser beam in this application allows much less IR power (as compared to using an IR laser beam by itself) and thus reduces damage through the dielectric layer. Performing the drilling and melting at the same time may be advantageous because the molten materials created by the drilling have lower reflectivity and thus better absorption of the IR laser beam. The drilling may also be performed in advance of the melting in this application.

Figure 9:
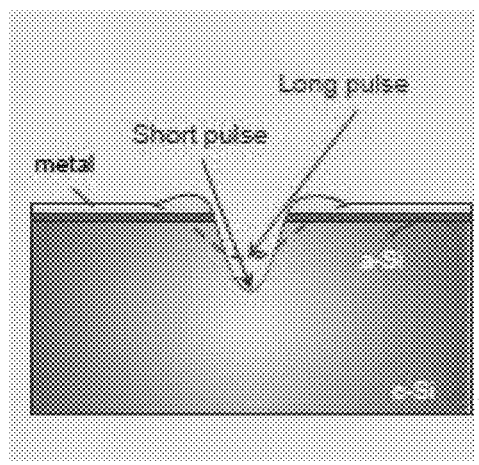
FIG. 9 is a schematic diagraph of a laser fired contact being formed using multiple-beam laser processing, consistent with an embodiment of the present disclosure.
Figures 9A, 9B, 9C:
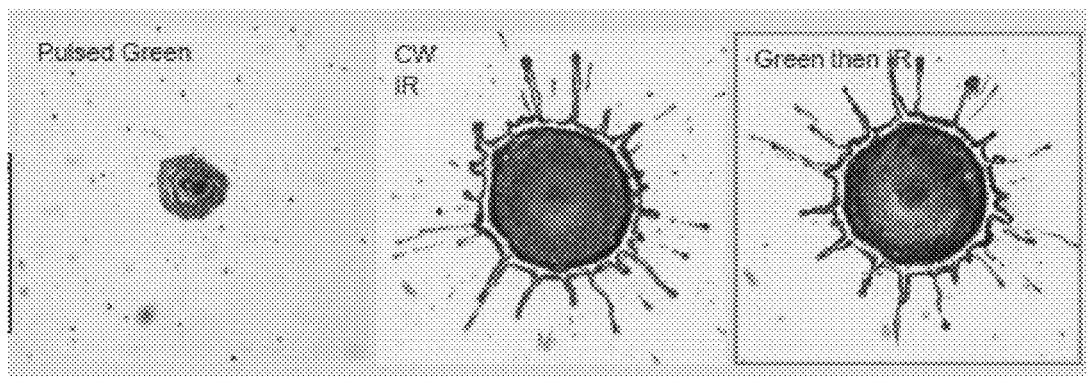
FIGS. 9A-9C are micrographs illustrating laser fired contacts being formed using single laser beams and using multiple-beam laser processing, consistent with an embodiment of the present disclosure.

One example of a forming laser fired contacts is shown in FIGS. 9 and 9A-9C. In this example, the first laser is a QCW IR fiber laser such as the YLM-150/1500 available from IPG Photonics Corp. and the second laser is a pulsed green fiber laser such as the GLPR-100/1/10 laser available from IPG Photonics Corp. As shown in FIG. 9, the green fiber laser with the shorter pulse is used to cause metal to penetrate and make contact with c-Si, thereby minimizing passivation impact, and the QCW IR fiber laser with the longer pulse is used to form molten metal and Si to refill inside the hole, which is then cooled to form metal/Si alloy. The green fiber laser also provides a smaller beam spot (e.g., 20 μm) than the IR fiber laser. FIGS. 9A-9C are micrographs illustrating attempts at forming laser fired contacts using only a pulsed green laser, only a QCW IR laser, and a green laser then an IR laser. Using multiple-beam laser processing to form laser fired contacts may result in less lifetime degradation and minimized damage.

In yet another application, a multiple-beam laser processing system and method may be used to perform soldering through a transparent substrate (e.g., sapphire or glass). In this application, the first laser beam may be used to induce a local change through the transparent substrate, thereby raising the temperature, and the second laser beam may then be used to perform the soldering. Alternatively, the first laser beam may be used through the transparent substrate to detach a material bonded to a carrier and then immediately followed by the second laser beam to melt or weld the material. In this application, the first laser beam may be a green or UV laser beam depending upon the materials and the second laser beam may be an IR laser beam.

In one example, a first substrate may include sapphire, GaN and a very thin layer of aluminum (e.g., only a few microns thick) and a second substrate may include a very thin layer of tin (e.g., only a few microns thick). One laser may be used to weld the aluminum and tin layers and one laser may be used to separate the sapphire from the GaN. In a further variation, an additional laser beam may also be used. For example, a green laser beam may be used to machine a pilot hole to assist melting, an IR laser beam may be used to melt, and a UV laser beam may be used to perform a laser lift off operation (e.g., to detach GaN from sapphire). Two or more of these laser beams may be used simultaneously to perform laser processing operations with a reduced number of steps.

Accordingly, multiple-beam laser processing systems and methods using laser beams with different characteristics may be used to perform enhanced laser processing for a variety of applications (e.g., drilling, cutting, and melting applications), particularly on difficult materials (e.g., transparent, highly reflective, and/or thin foils) where a single beam may be insufficient or where a single beam may require higher powers that might be damaging.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of multiple-beam laser processing of a workpiece made of a non-absorptive material, wherein the non-absorptive material includes sapphire or glass, the method comprising:

generating an assist laser beam with a first wavelength and a first pulse duration, wherein the non-absorptive material of the workpiece is sufficiently absorptive of the assist laser beam with the first wavelength and the first pulse duration to modify a property of the non-absorptive material;

generating a process laser beam with a second wavelength and a second pulse duration, wherein at least one of the first and second wavelengths and the first and second pulse durations are different, and wherein the process laser beam alone is not sufficiently absorbed in the non-absorptive material to complete processing the non-absorptive material, wherein the first wavelength is in a spectral range of 514-532 nm and the second wavelength is in a spectral range of 1040- 1070 nm, and wherein the first pulse duration is about 1 ns and the second pulse duration is greater than 10 μs; and directing the assist laser beam and the process laser beam at a target location on the workpiece such that the assist laser beam modifies a property of the non-absorptive material of the workpiece at the target location forming absorption centers and such that the process laser beam is coupled into the absorption centers formed in the non-absorptive material at the target location to complete processing of the non-absorptive material at the target location.

2. The method of claim 1 wherein the assist laser beam is generated by an assist laser, and wherein the process laser beam is generated by a process laser.

3. The method of claim 2 wherein the assist laser beam from the assist laser and the process laser beam from the process laser are combined and directed at the target location on the workpiece simultaneously.

4. The method of claim 1 wherein the first wavelength is shorter than the second wavelength, and wherein the first pulse duration is shorter than the second pulse duration.

5. The method of claim 1 wherein the first wavelength is in a visible spectral range and wherein the second wavelength is in an infrared spectral range.

6. The method of claim 1 wherein the first wavelength is in an ultraviolet (UV) spectral range and wherein the second wavelength is in a visible spectral range.

7. The method of claim 1 wherein the first wavelength is in an ultraviolet (UV) spectral range and wherein the second wavelength is in an infrared spectral range.

8. The method of claim 1 wherein the first pulse duration is in a range of less than 10 ns, and wherein the second pulse duration is in a range of greater than 1 microsecond.

9. The method of claim 1 wherein the first wavelength and the second wavelength are both in an infrared spectral range, and wherein the first pulse duration is in a range of less than 1 ns and the second pulse duration is in a range of greater than 1 microsecond.

10. The method of claim 1 wherein the non-absorptive material includes a transparent ceramic.

11. The method of claim 2 wherein the assist laser and the process laser are rare-earth-doped fiber lasers.

12. The method of claim 1 wherein directing the assist laser beam and the process laser beam includes focusing the laser beams.

13. The method of claim 1 wherein the process laser beam drills a hole through the non-absorptive material at the target location.

14. The method of claim 13 wherein the hole has a diameter less than 30 μm and a length greater than 300 μm.

15. The method of claim 1 wherein a single pulse of the process laser beam at the target location drills a hole through the non-absorptive material at the target location.

16. The method of claim 1 wherein the non-absorptive material is a reflective material to be welded to another material, wherein the assist laser beam increases a temperature of the reflective material such that reflectivity is lower, and wherein the process laser beam completes welding of the reflective material to the other material.

17. A multiple-beam laser processing system for processing a workpiece made of a non-absorptive material, the multiple-beam laser processing system comprising:
an assist laser for generating an assist laser beam with a first wavelength and a first pulse duration, wherein the non-absorptive material of the workpiece is sufficiently absorptive of the assist laser beam with the first wavelength and the first pulse duration to modify a property of the non-absorptive material, wherein the assist laser is a green fiber laser;
a process laser for generating a process laser beam with a second wavelength and a second pulse duration, wherein at least one of the first and second wavelengths and the first and second pulse durations are different, and wherein the process laser beam alone is not sufficiently absorbed in the non-absorptive material of the workpiece to complete processing of the non-absorptive material, wherein the process laser is an IR fiber laser; and
a beam combiner for directing the assist laser beam from the assist laser and the process laser beam from the process laser at a target location on the workpiece such that the assist laser beam with the first wavelength and the first pulse duration modifies a property of the non-absorptive material of the workpiece at the target location forming absorption centers and such that the process laser beam with the second wavelength and the second pulse duration is coupled into the absorption centers fanned in the non-absorptive material at the target location to complete processing of the non-absorptive material at the target location.

18. The multiple-beam laser processing system of claim 17 further including a focusing lens for focusing the assist laser beam from the assist laser and the process laser beam from the process laser at the target location.

19. The multiple-beam laser processing system of claim 17 further comprising an assist laser beam delivery system for controlling divergence of the assist laser beam such that the assist laser beam and the process laser beam have the same focal plane.

20. A multiple-beam laser processing system for processing a workpiece, the multiple-beam laser processing system comprising:
a first laser for generating a first laser beam with a first wavelength and a first pulse duration, wherein the first laser beam at the first wavelength and the first pulse duration, by itself, is not able to complete processing of the workpiece, wherein the first laser is a green fiber laser;
a second laser for generating a second laser beam with a second wavelength and a second pulse duration, wherein at least one of the first and second wavelengths and the first and second pulse durations are different, and wherein the second laser beam at the second wavelength and the second pulse duration, by itself, is not able to complete processing of the workpiece, wherein the second laser is an IR fiber laser; and
a beam combiner for directing the first laser beam from the assist laser and the second laser beam from the process laser at a target location on the workpiece such that the first laser beam with the first wavelength and the first pulse duration modifies a property and/or a geometry of the at least one layer of material to facilitate the second laser beam completing processing of the workpiece at the target location.

21. The multiple-beam laser processing system of claim 20 further comprising at least a third laser for generating a third laser beam with a third wavelength and a third pulse duration.

* * * * *